Patented Nov. 27, 1951

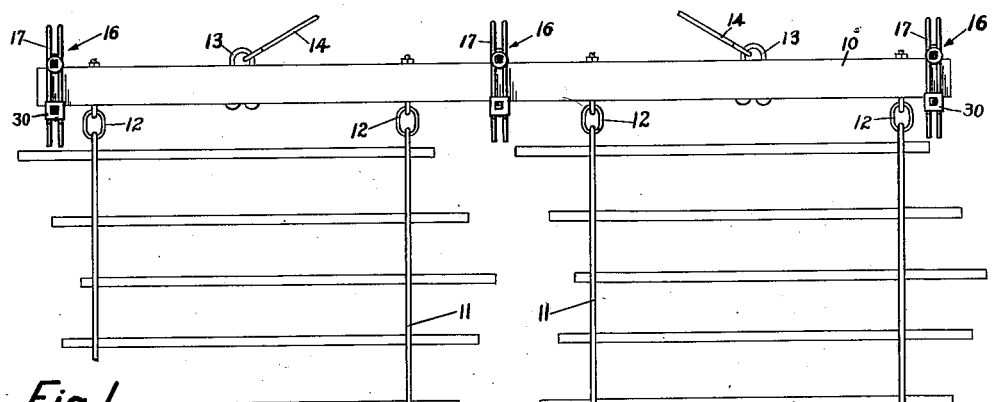
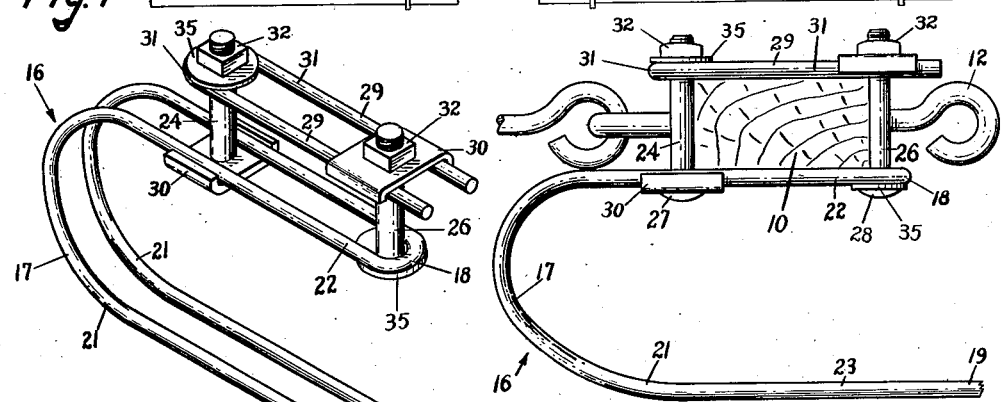
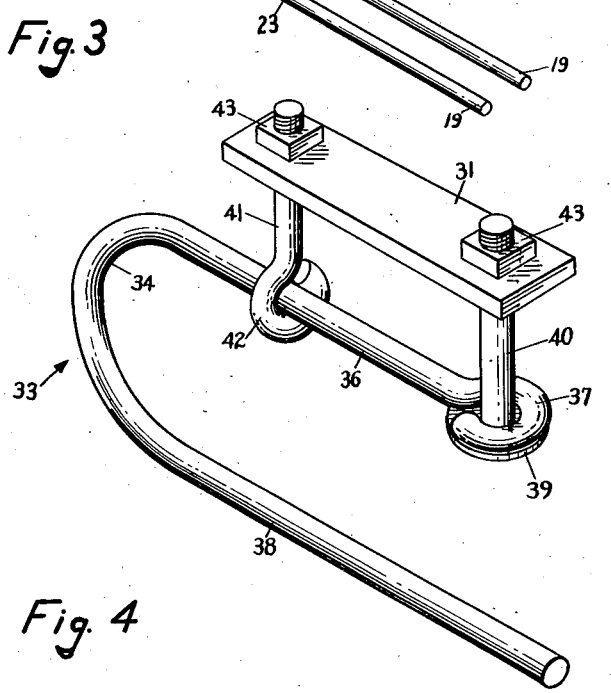

2,576,256

UNITED STATES PATENT OFFICE 2,576,256

HARROW RUNNER

Joseph B. Kucera, Traer, Iowa

Application June 14, 1948, Serial No. 32,798

1 Claim. (Cl. 280—12)

This invention relates generally to harrows and in particular to ground runners for supporting the front cross beam member or draw bar of a harrow.

Harrow constructions now in common use are of the same general design in that they usually include a front cross member, which in some harrow constructions functions as a draw bar, and harrow sections connected with the rear side of the cross member. However, the hitch or draft connections of the cross member with a tractor unit, either directly or through the intermediary of a draft or draw bar structure independent of the cross member, vary widely in their construction to in turn vary the application of the draft force on the harrow.

As a result, the efficiency of the harrow is often times impaired by the application of a draft force in what might be termed a low line level, so that the front teeth in particular are forced into the ground to a depth greater than the rear teeth whereby weeds, clods and the like tend to collect ahead of the front teeth. This digging in of the front teeth effects an upward and forward tilting movement of the rear teeth so that the harrowing function of the rear teeth is materially reduced and sometimes completely nullified. Further, the digging in of the front teeth increases the draft force on the tractor unit and necessitates frequent stops for the removal of accumulations from ahead of the front teeth.

It is an object of this invention, therefore, to provide an improved harrow.

A further object of this invention is to provide a runner for a harrow front cross member which is adapted to maintain the operating depth of all of the harrow teeth substantially uniform.

A further object of this invention is to provide runner supports for a harrow cross beam, which are capable of holding the harrow front teeth against digging into the ground.

A feature of this invention is found in the provision of a runner for a harrow drawbar which has an upper portion for supporting the drawbar and a lower ground-engaging portion. These two portions are spaced apart a distance such that the drawbar or front cross beam of the harrow is receivable therebetween. The runner is of a rod construction, and the rear end of its draw bar supporting portion terminates in a horizontally arranged loop. A clamp means, including a clamping bolt extended through the loop, is adapted to clamp the drawbar against either the top side or the bottom side of the drawbar supporting portion whereby to vary the vertical adjustment of the drawbar relative to the ground, and to the line of application of the draft force.

Further objects, features and advantages of this invention will become apparent from the following description when taken in connection with the accompanying drawings, in which:

Fig. 1 is a plan view of a harrow showing the runners of this invention in assembly relation with the harrow front cross beam or drawbar;

Fig. 2 is an enlarged side elevational view of a runner;

Fig. 3 is a perspective view of a runner with the harrow front cross beam removed; and Fig. 4 is a perspective view of a modified form of the invention.

With reference to the drawings, there is illustrated in Fig. 1 a harrow including a front cross beam 10 to which harrow sections 11 are attached through rear connections 12. Front connections 13, on the cross beam 10, are attached to the rear ends of rods or cables 14, the front ends of which are adapted for connection with a tractor unit (not shown). The beam 10 is equipped with runners of this invention, designated generally as 16, with three of such runners being illustrated in Fig. 1. Since the runners 16 are of a like construction and similarly assembled with the beam 10, only one thereof will be described in detail.

A runner 16 (Figs. 2 and 3) is comprised of a body member 17 formed from a single piece of a rod material having a bend or loop 18 intermediate its ends 19. The double lengths 21 of the rod or body member 17 are bent into a substantially U-shape so as to form a pair of transversely spaced runner sections connected together at the loop 18, which is horizontally disposed and defines the rear end of the upper leg 22 of the runner. This upper leg functions as a support for the beam 10, while the lower leg 23 of the runner constitutes the ground engaging member of the runner 16. The legs 22 and 23 are spaced apart a distance such that the beam 10 is receivable therebetween.

Extended between the parallel rod portions of the upper leg 22 are a pair of clamping bolts 24 and 26 having head members 27 and 28, respectively, associated with a clip 30 and washer 35, respectively, adapted to engage either the top side or the bottom side of the upper leg 22 (Figs. 2 and 3). The bolt 24 is located forwardly of the bolt 26 and the clip 30 is of a substantially U-shape construction so as to engage the upper leg in a straddled relation. The bolts 24 and 26 are extendible between the legs 29 of a U-shape clamp member 31 adapted to engage one side of the cross beam 10.

As shown in Fig. 2 the beam 10 is carried on the upper side of the leg 22 and is arranged transversely of the runner 16 at a position between the bolts 24 and 26. When in this position the clamp member 31 is engageable with the top side of the beam 10 so that on tightening of the bolt nuts 32 the beam 10 is rigidly clamped against the leg 22.

It is contemplated that the bolt 24 extend through the loop or bend at the closed end of the clamp member 31, and that a clip 30 be provided for the bolt 26 at the open end of the clamp member 31 and a washer 35 for the bolt 27 at the closed end of the clamp member 31.

To support the beam 10 against the lower side of the leg 22, it is only necessary to reverse the bolts 24 and 26 so that the clip 30 and washer 35, respectively, are engageable with the top side of the leg 22. The clamp member 31 is then engageable with the lower side of the beam 10 so that on tightening of the bolt nuts 32 the beam 10 is firmly clamped against the under side of the leg 22.

As best appears in Figs. 2 and 3, the lower leg 23 of the runner 16 is of a longer length than its upper leg 22 so that the ends 19 of the rod member 17 are located rearwardly of the loop 18. With the beam 10 supported on the leg 22, therefore, the runner 16 is stabilized against longitudinal tipping movement.

In operation, the double runners comprised of the double rod lengths 21, act to break up any clods over which the runner is traveling, and in conjunction with the upper leg 22, maintain the front teeth (not shown) of the harrow sections 11 from digging into the ground. This support of the front ends of the harrow sections 11 against downward tipping movement, results in such sections being maintained in substantially horizontal planes so that all of the harrow teeth are effective in a harrowing operation.

In the modified form of the invention shown in Fig. 4, a runner 33 includes a body member 34 of a substantially U-shape, having the rear end of its upper leg 36 terminating in a horizontally disposed loop member 37. The leg 36 constitutes a supporting section for the beam 10, while the lower leg 38 constitutes the ground engaging section of the runner.

The beam 10 is capable of being clamped against either the top side or the bottom side of the upper leg 36 by clamping means including a bolt 40 extendible through the loop 37 and having a head member 39 engageable with one side of the loop. An eye bolt 41 has its eye portion 42 mounted about the leg 36.

With the beam 10 arranged to one side or the other of the leg 36, and between the bolts 40 and 41, a clamp plate 31 is assembled with the bolts so as to engage a side of the beam 10. On tightening of the bolt nuts 43 the beam is rigidly clamped against the leg 36.

Although the invention has been described with respect to several embodiments thereof, it is to be understood that it is not to be so limited since changes can be made therein which are within the full intended scope of this invention, as defined by the appended claim.

I claim:

A runner device for a harrow having a front beam member including, a body member comprised of a rod having a loop intermediate its ends, and the double lengths thereof formed into a substantially U-shape to provide a pair of parallel transversely spaced upright runner sections, with said loop defining the rear end of the upper leg of said runner device, a pair of bolts insertible within the loop of said upper leg having portions engageable with one side of said loop, and a clamp member for said bolts, with said beam member being arranged between said upper leg and clamp member so as to be clamped therebetween, when said bolts are tightened.

JOSEPH B. KUCERA.

REFERENCES CITED

The following references are of record in the file of this patent:

UNITED STATES PATENTS

| Number | Name | Date |
|---|---|---|
| 996,251 | Jennings | June 27, 1911 |
| 1,127,169 | Boehne | Feb. 2, 1915 |
| 1,746,606 | Ray | Feb. 11, 1930 |
| 1,827,237 | Jones | Oct. 13, 1931 |